United States Patent
Moscoso et al.

(10) Patent No.: US 10,010,878 B2
(45) Date of Patent: Jul. 3, 2018

(54) HIGH MESO-SURFACE AREA, LOW SI/AL RATIO PENTASIL ZEOLITE

(71) Applicant: UOP LLC, Des Plaines, IL (US)

(72) Inventors: Jaime G. Moscoso, Mount Prospect, IL (US); Deng-Yang Jan, Elk Grove Village, IL (US)

(73) Assignee: UOP LLC, Des Plaines, IL (US)

( * ) Notice: Subject to any disclaimer, the term of this patent is extended or adjusted under 35 U.S.C. 154(b) by 429 days.

(21) Appl. No.: 14/636,672

(22) Filed: Mar. 3, 2015

(65) Prior Publication Data

US 2016/0256857 A1 Sep. 8, 2016

(51) Int. Cl.
*B01J 29/40* (2006.01)
*B01J 35/10* (2006.01)
*C01B 39/36* (2006.01)

(52) U.S. Cl.
CPC ........... *B01J 29/40* (2013.01); *B01J 35/1014* (2013.01); *B01J 35/1019* (2013.01); *C01B 39/36* (2013.01)

(58) Field of Classification Search
CPC .... B01J 29/40; B01J 35/1019; B01J 35/1014; C01B 39/36; C01B 39/365; C01B 39/38; C01B 39/40; C01B 39/48
See application file for complete search history.

(56) References Cited

U.S. PATENT DOCUMENTS

| | | |
|---|---|---|
| 3,996,305 A | 12/1976 | Berger |
| 4,341,914 A | 7/1982 | Berger |
| 4,642,406 A | 2/1987 | Schmidt |
| 4,939,110 A | 7/1990 | Sachtler |
| 5,157,183 A | 10/1992 | Cotterman |
| 5,417,844 A | 5/1995 | Boitiaux |
| 5,981,817 A | 11/1999 | Kao |
| 6,180,550 B1 | 1/2001 | Beck |
| 6,303,839 B1 | 10/2001 | Marker |
| 6,355,853 B1 | 3/2002 | Sharma |
| 6,413,941 B1 | 7/2002 | Garnett et al. |
| 6,858,129 B2 | 2/2005 | Mohr |
| 7,317,133 B2 | 1/2008 | Vora |
| 7,425,660 B2 | 9/2008 | Larson |
| 7,922,997 B2 * | 4/2011 | Moscoso .................. B01J 29/70 208/136 |
| 7,939,701 B2 | 5/2011 | Whitchurch |
| 8,030,239 B2 | 10/2011 | Oh |
| 8,134,037 B2 | 3/2012 | Bogdan |
| 8,273,935 B2 | 9/2012 | Rekoske |
| 8,574,542 B2 | 11/2013 | Domokos |
| 8,609,921 B1 * | 12/2013 | Nicholas .................. C01B 39/48 585/475 |
| 8,692,044 B2 | 4/2014 | Ou |
| 8,697,929 B2 | 4/2014 | Ou |
| 8,747,807 B2 * | 6/2014 | Jan .......................... C01B 39/48 208/135 |
| 8,889,937 B2 | 11/2014 | Haizmann |
| 8,889,940 B2 | 11/2014 | Bogdan |
| 8,900,548 B2 * | 12/2014 | Burton ..................... B01J 29/70 423/706 |
| 9,415,381 B2 * | 8/2016 | Burton ..................... B01J 29/70 |
| 2007/0060778 A1 | 3/2007 | Bogdan |
| 2008/0146859 A1 | 6/2008 | Rekoske |

FOREIGN PATENT DOCUMENTS

WO 035626 A1 3/2014
WO 150875 A1 9/2014

OTHER PUBLICATIONS

U.S. Appl. No. 14/636,541, filed Mar. 3, 2015, Kuzmanich.
U.S. Appl. No. 14/636,624, filed Mar. 3, 2015, Kuzmanich.
U.S. Appl. No. 14/636,798, filed Mar. 3, 2015, Schoenfeldt.
U.S. Appl. No. 14/636,898, filed Mar. 3, 2015, Moscoso.
U.S. Appl. No. 14/636,718, filed Mar. 3, 2015, Jan.
Raj, "Selective Formation of 1,2,4 Isomer among Trimethylbenzenes in the Methylation of Xylenes over Al- Ga-, and Fe-Silicates with MEL Structure" Journal of Catalysis, V. 138, pp. 518-524, Dec. 1992, ISSN 0021-9517, Academic Press.
Reddy, "Synthesis, Characterization, and Catalytic Properties of Metallo-Titanium Silicate Molecular Sieves with MEL Topology" Journal of Catalysis, 145, 1994, pp. 73-78.
Raj, "Catalytic Properties of [Al], [Ga], and [Fe]-silicate Analogs of ZSM-11 in C7 and C8 Aromatic Hydrocarbon Reactions: Influence of Isomorphous Substitution" Proc. Int. Zeolite Conf., 9th, 1993, 2, pp. 551-558.
Ahn, "Tailoring Mesoscopically Structured H-ZSM5 Zeolites for Toluene Methylation" Journal of Catalysis, 2014, pp. 271-280.
John, "Zeolite Containing Catalysts for the Conversion of C8-aromatics Fractions" Catalysis Today, 49, 1999 Elsevier Science B.V., pp. 211-220.
Harrison, "Some Sorptive and Catalytic Properties of Zeolite Nu-10" Zeolites, Jan. 1987, vol. 7, pp. 28-34.

* cited by examiner

*Primary Examiner* — Brian A McCaig
*Assistant Examiner* — Jason Y Chong

(57) ABSTRACT

A new family of crystalline aluminosilicate zeolites has been synthesized and designated as UZM-54. These zeolites are represented by the empirical formula:

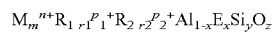

$$M_m{}^{n+}R_{1\ r1}P_1{}^+R_{2\ r2}P_2{}^+Al_{1-x}E_xSi_yO_z$$

where M is an alkali, alkaline earth, or rare earth metal such as sodium or strontium, $R_1$ and $R_2$ are organoammonium cation and E is a framework element such as gallium, iron, boron, or indium. These zeolites are characterized by unique x-ray diffraction patterns, high meso-surface areas and low $Si/Al_2$ ratios and have catalytic properties for carrying out various hydrocarbon conversion processes.

20 Claims, No Drawings

HIGH MESO-SURFACE AREA, LOW SI/AL RATIO PENTASIL ZEOLITE

FIELD OF THE INVENTION

The present invention relates to a new family of aluminosilicate zeolites, having a designation of UZM-54 have been synthesized. This family of zeolites are similar to MFI type zeolites, and is characterized by unique x-ray diffraction patterns and compositions and have catalytic properties for carrying out various hydrocarbon conversion processes.

BACKGROUND

Zeolites are crystalline aluminosilicate compositions which are microporous and which are formed from corner sharing $AlO_2$ and $SiO_2$ tetrahedra. Numerous zeolites, both naturally occurring and synthetically prepared, are used in various industrial processes. Synthetic zeolites are prepared via hydrothermal synthesis employing suitable sources of Si, Al and structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces as well as on internal surfaces within the pore.

One particular zeolitic material, classified as ZSM-5, is disclosed in Beck, et al., U.S. Pat. No. 6,180,550, issued on Jan. 30, 2001. The zeolite comprises a synthetic porous crystalline material having a composition involving the molar relationship:

$$X_2O_3:(n)YO_2,$$

wherein X is a trivalent element, such as aluminum, boron, iron and/or gallium, preferably aluminum; Y is a tetravalent element such as silicon and/or germanium, preferably silicon; and n is less than 25, and Wherein the slope of the nitrogen sorption isotherm of the material at a partial pressure of nitrogen of 0.4 to 0.7 and a temperature of 77° K is greater than 30.

While there are many types of zeolites, new zeolites provide for improved reaction conditions in the conversion of lower value hydrocarbon streams to higher value hydrocarbon products.

SUMMARY

A zeolite having a microporous crystalline structure comprising a framework of $AlO_2$ and $SiO_2$ tetrahedral units, and an empirical composition in the as synthesized and anhydrous basis expressed by the empirical formula of $M_m{}^{n+}R_{1\ r1}{}^{p_1}{}^+R_{2\ r2}{}^{p_2}{}^+AlSi_yO_z$ where M is at least one exchangeable cation selected from the group consisting of alkali and alkaline earth metals, "m" is the mole ratio of M to Al and varies from about 0 to about 1, $R_1$ is at least one organoammonium cation selected from the group consisting of quaternary ammonium cations, diquaternary ammonium cations, "$r_1$" is the mole ratio of $R_1$ to Al and has a value of about 0.1 to about 3.0, $R_2$ is at least one organoammonium cation selected from the group consisting of protonated alkanolamines, protonated amines, protonated diamines, and quaternized alkanolammonium cations, "$r_2$" is the mole ratio of $R_2$ to Al and has a value of about 0 to about 3.0, "n" is the weight average valence of M and has a value of about 1 to about 2, "$p_1$" is the weighted average valence of $R_1$ and has a value of about 1 to about 2, "$p_2$" is the weighted average valence of $R_2$ and has a value of about 1 to about 2, "y" is the mole ratio of Si to Al and varies from greater than 11 to about 30 and "z" is the mole ratio of O to Al and has a value determined by the equation $z=(m \cdot n + r_1 \cdot p_1 + r_2 \cdot p_2 + 3 + 4 \cdot y)/2$ and it is characterized in that it has the x-ray diffraction pattern having at least the d spacing and intensities set forth in Table A.

TABLE A

| 2Θ | d(Å) | I/Io |
|---|---|---|
| 7.91-8.05 | 10.83-11.16 | vs |
| 8.84-9.01 | 9.80-9.99 | vs |
| 14.87-14.91 | 5.93-5.95 | w-m |
| 15.51-15.65 | 5.65-5.70 | w |
| 15.91-16.12 | 5.49-5.56 | w |
| 20.41-20.59 | 4.31-4.34 | w |
| 20.82-20.94 | 4.25-4.43 | w |
| 23.25-23.61 | 3.76-3.82 | vs |
| 23.84-23.92 | 3.71-3.72 | m |
| 24.35-24.75 | 3.59-3.65 | m |
| 26.80-26.95 | 3.30-3.32 | w |
| 29.33-29.46 | 3.02-3.04 | w |
| 30.01-30.13 | 2.96-2.97 | w |
| 30.32-30.32 | 2.94-2.94 | w |

An embodiment of the zeolite is one, any or all of prior embodiments in this paragraph up through the first embodiment wherein the zeolite has a mesopore surface area between 80 m²/g and 300 m²/g. An embodiment of the zeolite is one, any or all of prior embodiments in this paragraph up through the first embodiment wherein the zeolite consists of small colonies of nanocrystalline zeolite. The colonies are roughly spherical or rosette-like. An embodiment of the zeolite is one, any or all of prior embodiments in this paragraph up through the first embodiment wherein the zeolite crystals have an individual crystal size from about 10-25 nm. An embodiment of the zeolite is one, any or all of prior embodiments in this paragraph up through the first embodiment wherein the zeolite is further characterized by very strong peaks in the x-ray diffraction pattern at 2θ from 7.91-8.05, 8.84-9.01 and 23.25-23.61. An embodiment of the zeolite is one, any or all of prior embodiments in this paragraph up through the first embodiment wherein the zeolite is a pentasil zeolite. An embodiment of the zeolite is one, any or all of prior embodiments in this paragraph up through the first embodiment wherein the zeolite is thermally stable up to a temperature of 1000° C. An embodiment of the zeolite is one, any or all of prior embodiments in this paragraph up through the first embodiment where M is selected from the group consisting of lithium, sodium, potassium, cesium, strontium, calcium, barium and mixtures thereof. An embodiment of the zeolite is one, any or all of prior embodiments in this paragraph up through the first embodiment where M is a mixture of an alkali metal and an alkaline earth metal. An embodiment of the zeolite is one, any or all of prior embodiments in this paragraph up through the first embodiment where $R_1$ is selected from the group consisting of dimethyldipropylammonimum, diethyldipropylammonium, propyltrimethylammonium, hexamethonium, and mixtures thereof. An embodiment of the zeolite is one, any or all of prior embodiments in this paragraph up through the first embodiment where $R_2$ is selected from the group consisting of diethanolamine, N-methylethanolamine, 2-dimethylaminoethanol, N-methyldiethanolamine, 2-diethylamino ethanol, 2-isopropylamino ethanol, 2-diisopropylamino ethanol, 3-dimethylamino propanol and 2-aminopropanol and mixtures thereof. An embodiment of the zeolite is one, any or all of prior embodiments in this paragraph up through the first embodiment where $r_2$ is equal to zero. An embodiment of the zeolite is one, any or all of prior embodiments in this paragraph up through the first embodiment where $R_1$ is selected from the group consisting of dimethyldipropylammonimum, diethyldipropylammonium, propyltrimethylammonium, hexamethonium, and mixtures thereof. An embodiment of the zeolite is one, any or all of prior embodiments in this paragraph up through the first embodiment where $R_1$ is a mixture of dimethyldipropylammonimum and a quaternary ammonium cation. An embodiment of the zeolite is one, any or all of prior embodiments in this paragraph up through the first embodiment where the crystallite size is from 61 to about 600 Å. An embodiment of the zeolite is one, any or all of prior embodiments in this paragraph up through the first embodiment wherein $R_1$ is dimethyldipropylammonium hydroxide. An embodiment of the zeolite is one, any or all of prior embodiments in this paragraph up through the first embodiment wherein the silica/alumina ($Si/Al_2$) ratio is between 22 and 50. An embodiment of the zeolite is one, any or all of prior embodiments in this paragraph up through the first embodiment wherein the zeolite is further characterized by a mesopore surface area greater than 80 m²/g. An embodiment of the zeolite is one, any or all of prior embodiments in this paragraph up through the first embodiment wherein $R_1$ is the dimethyldipropylammonium cation, where the source of $R_1$ is the halide or hydroxide compounds of $R_1$. An embodiment of the zeolite is one, any or all of prior embodiments in this paragraph up through the first embodiment wherein the zeolite has a microporous crystalline structure comprising a framework of $AlO_2$ and $SiO_2$ tetrahedral units, further including the element E and having the empirical composition in the as synthesized and anhydrous basis expressed by the empirical formula of $M_m^{n+}R_{1\ r1}^{p_1+}R_{2\ r2}^{p_2+}Al_{1-x}E_xSi_yO_z$ where "m" is the mole ratio of M to (Al+E) and varies from about 0 to about 1, "$r_1$" is the mole ratio of $R_1$ to (Al+E) and has a value of about 0.1 to about 3.0, "$r_2$" is the mole ratio of $R_2$ to (Al+E) and has a value of about 0 to about 3.0, E is an element selected from the group consisting of gallium, iron, boron, indium and mixtures thereof, "x" is the mole fraction of E and has a value from 0 to about 1.0, "y" is the mole ratio of Si to (Al+E) and varies from greater than 11 to about 30 and "z" is the mole ratio of O to (Al+E) and has a value determined by the equation $$z=(m\cdot n+r_1\cdot p_1+r_2\cdot p_2+3+4\cdot y)/2.$$

Other objects, advantages and applications of the present invention will become apparent to those skilled in the art from the following detailed description.

DETAILED DESCRIPTION

A new family of zeolitic materials has been successfully prepared, and is designated UZM-54. The topology of UZM-54 is unique as determined by its x-ray diffraction spectrum. The structure is related to MFI class of zeolite framework types.

There are many allotropes for zeolites having similar chemical formulae. The different allotropes can have very different physical and chemical properties, and can lead to many different uses. The easiest example is to look at the allotropes of carbon, a single type of atom but with many different structures, that leads to materials having, in some cases, diametrically opposed properties. Likewise for the allotropes of many zeolites, the discovery of new allotropes can be unexpected and their properties can also be unexpected and subsequently can lead to new uses from those properties.

There have been reports to synthesize pentasil zeolites of small crystallite size as reflected by the high external surface areas again derived from $N_2$ adsorption measurement. Typically the high external surface area is accomplished by using alkoxide precursors of Si and Al or Si, such as Al(i-PrO)$_3$ and TEOS, and in some cases in conjunction with high dosages of TPA or TBA. This approach yielded MFI of external surface areas ranging from 100 to about 200 m²/gm with $Si/Al_2$ ratios of greater than about 60. Difficulties of crystallization arose when $Si/Al_2$ of the synthesis mixtures were lower than 60 as shown by the literature. For industrial catalytic application there is a need for zeolite of high external surface areas with higher acid site density.

The present invention is a new pentasil zeolite. The present zeolite is thermally stable up to a temperature of 1000° C., and presents a new material for use in a variety of applications due to its stability and other properties. The zeolite comprises a microporous crystalline structure comprising a framework of $AlO_2$ and $SiO_2$ tetrahedral units, and an empirical composition in the as synthesized and anhydrous basis expressed by the empirical formula of:

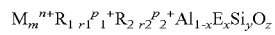

In the formula, M is at least one exchangeable cation selected from the group consisting of alkali and alkaline earth metals, "m" is the mole ratio of M to (Al+E) and varies from about 0 to about 1, $R_1$ is at least one organoammonium cation selected from the group consisting of quaternary ammonium cations, diquaternary ammonium cations, "$r_1$" is the mole ratio of $R_1$ to Al and has a value of about 0.1 to about 3.0, $R_2$ is at least one organoammonium cation selected from the group consisting of protonated alkanolamines, protonated amines, protonated diamines, and quaternized alkanolammonium cations, "$r_2$" is the mole ratio of $R_2$ to Al and has a value of about 0 to about 3.0, "n" is the weight average valence of M and has a value of about 1 to about 2, "$p_1$" is the weighted average valence of $R_1$ and has a value of about 1 to about 2, "$p_2$" is the weighted average valence of $R_2$ and has a value of about 1 to about 2, "y" is the mole ratio of Si to Al and varies from greater than 11 to about 30 and "z" is the mole ratio of O to Al and has a value determined by the equation:

$$z=(m\cdot n+r_1\cdot p_1+r_2\cdot p_2+3+4\cdot y)/2.$$

The zeolite is further characterized in that it has the x-ray diffraction pattern having at least the d spacing and intensities set forth in Table A:

TABLE A

| 2Θ | d(Å) | I/Io |
|---|---|---|
| 7.91-8.05 | 10.83-11.16 | vs |
| 8.84-9.01 | 9.80-9.99 | vs |
| 14.87-14.91 | 5.93-5.95 | w-m |
| 15.51-15.65 | 5.65-5.70 | w |
| 15.91-16.12 | 5.49-5.56 | w |
| 20.41-20.59 | 4.31-4.34 | w |
| 20.82-20.94 | 4.25-4.43 | w |

TABLE A-continued

| 2Θ | d(Å) | I/Io |
|---|---|---|
| 23.25-23.61 | 3.76-3.82 | vs |
| 23.84-23.92 | 3.71-3.72 | m |
| 24.35-24.75 | 3.59-3.65 | m |
| 26.80-26.95 | 3.30-3.32 | w |
| 29.33-29.46 | 3.02-3.04 | w |
| 30.01-30.13 | 2.96-2.97 | w |
| 30.32-30.32 | 2.94-2.94 | w |

The zeolite can be seen as characterized by the very strong peaks in the x-ray diffraction pattern at 2θ from 7.91-8.05, 8.84-9.01 and 23.25-23.61.

In one embodiment, the zeolite is formed where the amount of the metal E is zero. In this embodiment, the zeolite is represented by the empirical composition in the as synthesized and anhydrous basis expressed by the empirical formula of:

$$M_m^{n+}R_{1\,r1}^{p1+}R_{2\,r2}^{p2+}AlSi_yO_z$$

where M is at least one exchangeable cation selected from the group consisting of alkali and alkaline earth metals, "m" is the mole ratio of M to Al and varies from about 0 to about 1, $R_1$ is at least one organoammonium cation, "$r_1$" is the mole ratio of $R_1$ to Al and has a value of about 0.1 to about 3.0, $R_2$ is at least one organoammonium cation, "$r_2$" is the mole ratio of $R_2$ to Al and has a value of about 0 to about 3.0, "n" is the weight average valence of M and has a value of about 1 to about 2, "$p_1$" is the weighted average valence of $R_1$ and has a value of about 1 to about 2, "$p_2$" is the weighted average valence of $R_2$ and has a value of about 1 to about 2, "y" is the mole ratio of Si to Al and varies from greater than 11 to about 30 and "z" is the mole ratio of O to Al and has a value determined by the equation:

$$z=(m \cdot n + r_1 \cdot p_1 + r_2 \cdot p_2 + 3 + 4 \cdot y)/2.$$

The zeolite is further characterized by a mesopore having a surface area greater than 80 m²/g, with the surface area generally between 80 m²/g and 300 m²/g. This zeolite is formed into small colonies of nanocrystalline zeolite. The colonies are roughly spherical or rosette-like.

Examples of the organoammonium cations include but are not limited to dimethyldipropylammonium cation (DMDPA⁺), diethyldipropylammonium cation (DEDPA⁺), choline [(CH3)3N(CH2)₂OH]⁺, ethyltrimethylammonium cation (ETMA⁺), diethyldimethylammonium cation (DEDMA⁺), propyltrimethylammonium (PTMA⁺), butyltrimethylammonium (BTMA⁺), dimethyldiethanolammonium cation, methyltripropylammonium (MTPA⁺), tetraethylammonium cation (TEA⁺), tetrapropylammonium cation (TPA⁺) and mixtures thereof.

Preferred organoammonium cations selected for $R_1$ include one or more of dimethyldipropylammonimum, diethyldipropylammonium, propyltrimethylammonium, and hexamethonium. Preferred organoammonium cations selected for $R_2$ include one or more of diethanolamine, N-methylethanolamine, 2-dimethylaminoethanol, N-methyldiethanolamine, 2-diethylamino ethanol, 2-isopropylamino ethanol, 2-diisopropylamino ethanol, 3-dimethylamino propanol and 2-aminopropanol. In one embodiment of the zeolite, the value of $r_2$ is equal to zero, and $R_2$ is not added to the mixture for forming the zeolite. The source of the organoammonium cations for the reaction mixture to form the zeolites can comprise a halide or hydroxide of the organoammonium compound. A preferred organoammonion compound for $R_1$ is dimethyldipropylammonium hydroxide.

The exchangeable cation M can be a mixture of an alkali metal and an alkaline earth metal. Preferred cation M include one or more of the metals lithium, sodium, potassium, cesium, strontium, calcium, and barium.

Where M is only one metal, then the weighted average valence is the valence of that one metal, i.e. +1 or +2. However, when more than one M metal is present, the total amount of:

$$M_m^{n+}=M_{m1}^{(n1)+}+M_{m2}^{(n2)+}+M_{m3}^{(n3)+}+\ldots$$

and the weighted average valence "n" is given by the equation:

$$n = \frac{m_1 \cdot n_1 + m_2 \cdot n_2 + m_3 \cdot n_3 + \ldots}{m_1 + m_2 + m_3 + \ldots}.$$

The structure of the zeolite is important, and it is preferred that the crystallite size is from 61 Å to 600 Å, with a preferred individual crystal size from 10 to 25 nm. The silica to alumina (Si/Al₂) ratio for this new zeolite is between 22 and 50.

Preparation of the Zeolite

The microporous crystalline zeolite, UZM-54, is prepared by a hydrothermal crystallization of a reaction mixture prepared by combining reactive sources of M, R, aluminum, silicon and optionally E. The sources of aluminum include but are not limited to aluminum alkoxides, precipitated aluminas, aluminum metal, aluminum salts and alumina sols. Specific examples of aluminum alkoxides include, but are not limited to aluminum ortho sec-butoxide and aluminum ortho isopropoxide. Sources of silica include but are not limited to tetraethylorthosilicate, colloidal silica, precipitated silica and alkali silicates. Sources of the E elements include but are not limited to alkali borates, boric acid, precipitated gallium oxyhydroxide, gallium sulfate, ferric sulfate, and ferric chloride. Sources of the M metals, potassium and sodium, include the halide salts, nitrate salts, acetate salts, and hydroxides of the respective alkali metals. R is an organoammonium cation selected from the group consisting of dimethyldipropylammonium, diethyldipropylammonium, choline, ETMA, DEDMA, TEA, TPA, propyltrimethylammonium, butyltrimethylammonium, dimethyldiethanolammonium and mixtures thereof, and the sources include the hydroxide, chloride, bromide, iodide and fluoride compounds. Specific examples include without limitation dimethyldipropylammonium hydroxide, dimethyldipropylammonium chloride, dimethyldipropylammonium bromide, diethyldipropylammonium hydroxide, diethyldipropylammonium chloride, ethyltrimethylammonium hydroxide, diethyldimethylammonium hydroxide, tetraethylammonium hydroxide, tetrapropylammonium hydroxide, tetrapropylammonium chloride.

In particular, by using dimethydipropylammonium hydroxide (DMDPAOH) SDA, alkali metal cations such as Na and optionally diethanolamine (DEA), an unexpected pentasil of very small crystallite was synthesized with a high external surface areas and a low Si/Al₂ ratio. Using SDA system combining DMDPAOH, Na and optionally DEA very small crystallites, with high external surface areas, can be consistently synthesized at low Si/Al₂ ratios as shown in the attached file.

The reaction mixture containing reactive sources of the desired components can be described in terms of molar ratios of the oxides by the formula:

$$aM_2O:bR_{2/p}O:(1-c)Al_2O_3:cE_2O_3:dSiO_2:eH_2O$$

where "a" varies from about 0.1 to about 10, "b" varies from about 1 to about 10, "c" varies from 0 to 1.0, "d" varies from about 10 to about 30, and "e" varies from about 50 to about 1000. If alkoxides are used, it is preferred to include a distillation or evaporative step to remove the alcohol hydrolysis products. The reaction mixture is now reacted at a temperature of about 150° C. to about 200° C., about 165° C. to about 185° C., or about 170° C. to about 180° C., for a period of about 1 day to about 3 weeks and preferably for a time of about 5 days to about 12 days in a sealed reaction vessel under autogenous pressure. After crystallization is complete, the solid product is isolated from the heterogeneous mixture by means such as filtration or centrifugation, and then washed with deionized water and dried in air at ambient temperature up to about 100° C. It should be pointed out that UZM-54 seeds can optionally be added to the reaction mixture in order to accelerate the formation of the zeolite.

The UZM-54 is a zeolite with a predominantly MFI structure with a maximum of 10% MEL intergrowth.

Example 1

An aluminosilicate reaction gel was prepared by first mixing 46.51 g of liquid sodium aluminate (LSA), 145.21 g of dimethyldipropylammonimum hydroxide (40% SACHEM), 41.54 g of diethanolamine (Aldrich) and 952.88 g of water while stirring vigorously. After thorough mixing, 213.86 g of Ultrasil VN SP 89% was added. After the addition was completed, the resulting reaction mixture was homogenized for ½ hour, transferred to a 2-L Parr hastelloy stir autoclave. The mixture was crystallized at 173° C. with stirring at 300 RPM for 93 hours. The solid product was recovered by filtration, washed with de-ionized water and dried at 80° C. The product was identified as UZM-54 by XRD. Representative diffraction lines observed for the product are shown in Table 1. The product composition was determined by elemental analysis to consist of the following mole ratios: Si/Al=13.24, Na/Al=0.6. A portion of the material was calcined by ramping to 600° C. for 2 hours followed by a 5 hour dwell in air. The BET surface area was 461 m$^2$/g, the micropore area was 218 m$^2$/g, the mesopore area was 243 m$^2$/g, the micropore volume was 0.11 cc/g, and mesopore volume was 0.72 cc/g. Scanning Electron Microscopy (SEM) revealed crystals of round (grape-like) shape less than 100 nm. Chemical analysis was as follows: 3.06% Al, 42.1% Si, 1.57% Na, 0.98% N, N/Al=0.61, Na/Al=0.6, Si/Al$_2$=26.49.

TABLE 1

| 2θ | d(Å) | I/I$_0$ % |
|---|---|---|
| 7.93 | 11.13 | vs |
| 8.90 | 9.92 | vs |
| 13.93 | 6.35 | w |
| 14.88 | 5.94 | m |
| 15.56 | 5.69 | w |
| 15.97 | 5.54 | w |
| 17.85 | 4.96 | w |
| 20.41 | 4.34 | w |
| 20.84 | 4.25 | w |
| 23.31 | 3.81 | vs |
| 23.92 | 3.71 | m |
| 24.54 | 3.62 | m |
| 26.85 | 3.31 | w |
| 29.46 | 3.02 | w |
| 30.07 | 2.96 | w |
| 45.14 | 2.00 | w |
| 45.43 | 1.99 | w |

Representative diffractions lines observed for the calcined UZM-54 are shown in Table 2.

TABLE 2

| 2θ | d(Å) | I/I$_0$ % |
|---|---|---|
| 7.96 | 11.09 | vs |
| 8.86 | 9.97 | vs |
| 14.82 | 5.97 | w |
| 15.97 | 5.54 | w |
| 20.50 | 4.32 | w |
| 20.98 | 4.23 | w |
| 23.31 | 3.81 | vs |
| 23.92 | 3.71 | s |
| 25.50 | 3.49 | w |
| 26.73 | 3.33 | w |
| 29.53 | 3.02 | w |
| 30.06 | 2.97 | w |
| 45.00 | 2.01 | w |
| 45.58 | 1.98 | w |

Example 2

An aluminosilicate reaction gel was prepared by first mixing 46.51 g of liquid sodium aluminate (LSA), 145.21 g of dimethyldipropylammonimum hydroxide (40% SACHEM), 41.54 g of diethanolamine (Aldrich) and 952.88 g of water while stirring vigorously. After thorough mixing, 213.86 g of Ultrasil VN SP 89% was added. After the addition was completed, the resulting reaction mixture was homogenized for ½ hour, transferred to a 2-L Parr hastelloy stir autoclave. The mixture was crystallized at 175° C. with stirring at 300 RPM for 67 hours. The solid product was recovered by filtration, washed with de-ionized water and dried at 80° C. The product was identified as UZM-54 by XRD. Representative diffraction lines observed for the product are shown in Table 3. The product composition was determined by elemental analysis to consist of the following mole ratios: Si/Al=13.35, Na/Al=0.49. A portion of the material was calcined by ramping to 600° C. for 2 hours followed by a 5 hour dwell in air. The BET surface area was 339 m$^2$/g, the micropore area was 155 m$^2$/g, the mesopore area was 184 m$^2$/g, the micropore volume was 0.08 cc/g, and mesopore volume was 0.531 cc/g. Scanning Electron Microscopy (SEM) revealed crystals with a roughly spherical or rosette-like morphology of 10 to 25 nm. Chemical analysis was as follows: 3.10% Al, 43.0% Si, 1.30% Na, 1% N, N/Al=0.62, Na/Al=0.49 Si/Al$_2$=26.71.

TABLE 3

| 2θ | d(Å) | I/I$_0$ % |
|---|---|---|
| 8.05 | 10.83 | vs |
| 9.01 | 9.80 | vs |
| 14.91 | 5.93 | m |
| 15.65 | 5.65 | w |
| 16.12 | 5.49 | w |
| 18.14 | 4.88 | w |
| 23.61 | 3.76 | vs |
| 24.75 | 3.59 | m |
| 30.08 | 2.96 | w |
| 30.32 | 2.94 | w |
| 45.31 | 1.99 | w |
| 45.64 | 1.98 | w |

Example 3

An aluminosilicate reaction gel was prepared by first mixing 697.60 g of liquid sodium aluminate (LSA), 2178.08 g of dimethyldipropylammonimum hydroxide (40% SACHEM), 623.14 g of diethanolamine (Aldrich) and 14293.27 g of water while stirring vigorously. After thorough mixing, 3207.91 g of Ultrasil VN SP 89% was added. After the addition was completed, the resulting reaction mixture was homogenized for ½ hour, transferred to a 5-gallon hastelloy stir autoclave. The mixture was crystallized at 175° C. with stirring at 245 RPM for 92 hours. The solid product was recovered by centrifugation, washed with de-ionized water and dried at 80° C. The product was identified as UZM-54 by XRD. Representative diffraction lines observed for the product are shown in Table 4. The product composition was determined by elemental analysis to consist of the following mole ratios: Si/Al=13.45, Na/Al=0.589. A portion of the material was calcined by ramping to 600° C. for 2 hours followed by a 5 hour dwell in air. The BET surface area was 416 m$^2$/g, the micropore area was 229 m$^2$/g and the mesopore area was 187 m$^2$/g and the micropore volume was 0.118 cc/g and mesopore volume was 0.762 cc/g. Scanning Electron Microscopy (SEM) revealed crystals with a roughly spherical or rosette-like morphology of 10 to 25 nm. Chemical analysis was as follows: 3.07% Al, 42.9% Si, 1.54% Na, 0.90% N, N/Al=0.56, Na/Al=0.59 Si/Al$_2$=26.91.

TABLE 4

| 2θ | d(Å) | I/I$_0$ % |
|---|---|---|
| 7.91 | 11.16 | vs |
| 8.84 | 9.99 | vs |
| 14.87 | 5.95 | w |
| 15.91 | 5.56 | w |
| 23.26 | 3.82 | vs |
| 23.84 | 3.72 | m |
| 24.43 | 3.64 | m |
| 26.80 | 3.32 | w |
| 30.02 | 2.97 | w |
| 45.46 | 1.99 | w |

Example 4

An aluminosilicate reaction gel was prepared by first mixing 697.60 g of liquid sodium aluminate (LSA), 2178.08 g of dimethyldipropylammonimum hydroxide (40% SACHEM), 623.14 g of diethanolamine (Aldrich) and 14293.27 g of water while stirring vigorously. After thorough mixing, 3207.91 g of Ultrasil VN SP 89% was added. After the addition was completed, the resulting reaction mixture was homogenized for ½ hour, transferred to a 5-gallon hastelloy stir autoclave. The mixture was crystallized at 175° C. with stirring at 251 RPM for 118 hours. The solid product was recovered by centrifugation, washed with de-ionized water and dried at 80° C. The product was identified as UZM-54 by XRD. Representative diffraction lines observed for the product are shown in Table 5. The product composition was determined by elemental analysis to consist of the following mole ratios: Si/Al=12.95, Na/Al=0.47. A portion of the material was calcined by ramping to 600° C. for 2 hours followed by a 5 hour dwell in air. The BET surface area was 401 m$^2$/g, the micropore area was 248 m$^2$/g and the mesopore area was 153 m$^2$/g and the micropore volume was 0.128 cc/g and mesopore volume was 0.753 cc/g. Scanning Electron Microscopy (SEM) revealed crystals with a roughly spherical or rosette-like morphology of 10 to 25 nm. Chemical analysis was as follows: 3.21% Al, 43.2% Si, 1.28% Na, 0.90 1.0% N, N/Al=0.6, Na/Al=0.47 Si/Al$_2$=25.91.

TABLE 5

| 2θ | d(Å) | I/I$_0$ % |
|---|---|---|
| 7.86 | 11.23 | vs |
| 8.80 | 10.04 | vs |
| 14.70 | 6.02 | w |
| 15.89 | 5.56 | w |
| 20.26 | 4.37 | w |
| 20.72 | 4.28 | w |
| 23.10 | 3.84 | vs |
| 23.70 | 3.75 | m |
| 26.74 | 3.33 | w |
| 29.16 | 3.05 | w |
| 29.90 | 2.98 | w |
| 45.22 | 2.00 | w |

Example 5

An aluminosilicate reaction gel was prepared by first mixing 697.60 g of liquid sodium aluminate (LSA), 2178.08 g of dimethyldipropylammonimum hydroxide (40% SACHEM), 623.14 g of diethanolamine (Aldrich) and 14293.27 g of water while stirring vigorously. After thorough mixing, 3207.91 g of Ultrasil VN SP 89% was added. After the addition was completed, the resulting reaction mixture was homogenized for ½ hour, transferred to a 5-gallon hastelloy stir autoclave. The mixture was crystallized at 175° C. with stirring at 168 RPM for 92 hours. The solid product was recovered by centrifugation, washed with de-ionized water and dried at 80° C. The product was identified as UZM-54 by XRD. Representative diffraction lines observed for the product are shown in Table 6. The product composition was determined by elemental analysis to consist of the following mole ratios: Si/Al=13.40, Na/Al=0.52. A portion of the material was calcined by ramping to 600° C. for 2 hours followed by a 5 hour dwell in air. The BET surface area was 378 m$^2$/g, the micropore area was 227 m$^2$/g and the mesopore area was 151 m$^2$/g and the micropore volume was 0.117 cc/g and mesopore volume was 0.589 cc/g. Scanning Electron Microscopy (SEM) revealed crystals with a roughly spherical or rosette-like morphology of 10 to 25 nm. Chemical analysis was as follows: 3.06% Al, 42.6% Si, 1.35% Na, 1.11% N, N/Al=0.70, Na/Al=0.52, Si/Al$_2$=26.81.

TABLE 6

| 2θ | d(Å) | I/I$_0$ % |
|---|---|---|
| 7.90 | 11.18 | vs |
| 8.82 | 10.01 | vs |
| 14.72 | 6.01 | w |
| 15.88 | 5.57 | w |
| 20.3 | 4.37 | w |
| 20.72 | 4.28 | w |
| 23.16 | 3.83 | vs |
| 23.76 | 3.74 | m |
| 26.78 | 3.32 | w |
| 29.22 | 3.05 | w |
| 29.92 | 2.98 | w |
| 45.26 | 2.00 | w |

Example 6

An aluminosilicate reaction gel was prepared by first mixing 697.60 g of liquid sodium aluminate (LSA), 2178.08 g of dimethyldipropylammonimum hydroxide (40% SACHEM), 623.14 g of diethanolamine (Aldrich) and 14293.27 g of water while stirring vigorously. After thorough mixing, 3207.91 g of Ultrasil VN SP 89% was added. After the addition was completed, the resulting reaction mixture was homogenized for ½ hour, transferred to a 5-gallon hastelloy stir autoclave. The mixture was crystallized at 175° C. with stirring at 298 RPM for 89 hours. The solid product was recovered by centrifugation, washed with de-ionized water and dried at 80° C. The product was identified as UZM-54 by XRD. Representative diffraction lines observed for the product are shown in Table 7. The product composition was determined by elemental analysis to consist of the following mole ratios: Si/Al=13.93, Na/Al=0.53. A portion of the material was calcined by ramping to 600° C. for 2 hours followed by a 5 hour dwell in air. The BET surface area was 407 $m^2/g$, the micropore area was 237 $m^2/g$ and the mesopore area was 170 $m^2/g$ and the micropore volume was 0.121 cc/g and mesopore volume was 0.804 cc/g. Scanning Electron Microscopy (SEM) revealed crystals with a roughly spherical or rosette-like morphology of 10 to 25 nm. Chemical analysis was as follows: 2.93% Al, 42.4% Si, 1.32% Na, 0.92% N, N/Al=0.60, Na/Al=0.53, Si/$Al_2$=27.86.

TABLE 7

| 2θ | d(Å) | I/$I_0$ % |
|---|---|---|
| 7.84 | 11.26 | vs |
| 8.76 | 10.08 | vs |
| 14.78 | 5.98 | w |
| 15.86 | 5.58 | w |
| 20.24 | 4.38 | w |
| 20.78 | 4.27 | w |
| 23.10 | 3.84 | vs |
| 23.70 | 3.75 | m |
| 26.76 | 3.32 | w |
| 29.16 | 3.05 | w |
| 29.84 | 2.99 | w |
| 45.26 | 2.00 | w |

Example 7

An aluminosilicate reaction gel was prepared by first mixing 697.60 g of liquid sodium aluminate (LSA), 2189.02 g of dimethyldipropylammonimum hydroxide (39.8% SACHEM), 623.14 g of diethanolamine (Aldrich) and 14282.33 g of water while stirring vigorously. After thorough mixing, 3207.91 g of Ultrasil VN SP 89% was added. After the addition was completed, the resulting reaction mixture was homogenized for ½ hour, transferred to a 5-gallon hastelloy stir autoclave. The mixture was crystallized at 175° C. with stirring at 300 RPM for 89 hours. The solid product was recovered by centrifugation, washed with de-ionized water and dried at 80° C. The product was identified as UZM-54 by XRD. Representative diffraction lines observed for the product are shown in Table 8. The product composition was determined by elemental analysis to consist of the following mole ratios: Si/Al=13.92, Na/Al=0.59. A portion of the material was calcined by ramping to 600° C. for 2 hours followed by a 5 hour dwell in air. The BET surface area was 483 $m^2/g$, the micropore area was 197 $m^2/g$ and the mesopore area was 286 $m^2/g$ and the micropore volume was 0.101 cc/g and mesopore volume was 0.796 cc/g. Scanning Electron Microscopy (SEM) revealed crystals with a roughly spherical or rosette-like morphology of 10 to 25 nm. Chemical analysis was as follows: 2.98% Al, 43.1% Si, 1.50% Na, 0.93% N, N/Al=0.60, Na/Al=0.59, Si/$Al_2$=27.85.

TABLE 8

| 2θ | d(Å) | I/$I_0$ % |
|---|---|---|
| 7.97 | 11.08 | vs |
| 8.86 | 9.97 | s |
| 14.91 | 5.93 | w |
| 16.01 | 5.53 | w |
| 20.59 | 4.31 | w |
| 20.82 | 4.26 | w |
| 23.28 | 3.81 | vs |
| 23.86 | 3.72 | s |
| 24.51 | 3.62 | m |
| 26.95 | 3.30 | w |
| 29.33 | 3.04 | w |
| 30.13 | 2.96 | w |
| 45.13 | 2.00 | w |
| 45.43 | 1.99 | w |

Example 8

An aluminosilicate reaction gel was prepared by first mixing 42.31 g of liquid sodium aluminate (LSA), 149.78 g of dimethyldipropylammonimum hydroxide (40% SACHEM), 1.56 g of NaOH (Aldrich) and 985.76 g of water while stirring vigorously. After thorough mixing, 220.59 g of Ultrasil VN SP 89% was added. After the addition was completed, the resulting reaction mixture was homogenized for ½ hour, transferred to a 2-L Parr hastelloy stir autoclave. The mixture was crystallized at 175° C. with stirring at 300 RPM for 89 hours. The solid product was recovered by filtration, washed with de-ionized water and dried at 80° C. The product was identified as UZM-54 by XRD. Representative diffraction lines observed for the product are shown in Table 9. The product composition was determined by elemental analysis to consist of the following mole ratios: Si/Al=13.16, Na/Al=0.64. A portion of the material was calcined by ramping to 600° C. for 2 hours followed by a 5 hour dwell in air. The BET surface area was 400 $m^2/g$, the micropore area was 264 $m^2/g$ and the mesopore area was 136 $m^2/g$ and the micropore volume was 0.136 cc/g and mesopore volume was 0.636 cc/g. Scanning Electron Microscopy (SEM) revealed crystals with a roughly spherical or rosette-like morphology of 10 to 25 nm. Chemical analysis was as follows: 2.7% Al, 42.5% Si, 1.22% Na, 0.9% N, N/Al=0.64, Na/Al=0.53, Si/$Al_2$=30.2.

TABLE 9

| 2θ | d(Å) | I/$I_0$ % |
|---|---|---|
| 7.88 | 11.21 | vs |
| 8.80 | 10.04 | vs |
| 14.79 | 5.98 | w |
| 15.82 | 5.59 | w |
| 20.30 | 4.37 | w |
| 20.78 | 4.27 | w |
| 23.08 | 3.85 | vs |
| 23.78 | 3.73 | m |
| 26.76 | 3.32 | w |
| 29.20 | 3.05 | w |
| 29.91 | 2.98 | w |
| 45.27 | 2.00 | w |

Example 9

An aluminosilicate reaction gel was prepared by first mixing 46.51 g of liquid sodium aluminate (LSA), 145.21 g of dimethyldipropylammonimum hydroxide (40% SACHEM), 41.54 g of diethanolamine (Aldrich) and 952.88 g of water while stirring vigorously. After thorough mixing, 213.86 g of Ultrasil VN SP 89% was added. After the addition was completed, the resulting reaction mixture was homogenized for ½ hour, transferred to a 2-L Parr hastelloy stir autoclave. The mixture was crystallized at 173° C. with stirring at 300 RPM for 67 hours. The solid product was recovered by filtration, washed with de-ionized water and dried at 80° C. The product was identified as UZM-54 by XRD. Representative diffraction lines observed for the product are shown in Table 10. The product composition was determined by elemental analysis to consist of the following mole ratios: Si/Al=14.05, Na/Al=0.51. A portion of the material was calcined by ramping to 600° C. for 2 hours followed by a 5 hour dwell in air. The BET surface area was 422 m$^2$/g, the micropore area was 247 m$^2$/g and the mesopore area was 175 m$^2$/g and the micropore volume was 0.127 cc/g and mesopore volume was 0.64 cc/g. Scanning Electron Microscopy (SEM) revealed crystals with a roughly spherical or rosette-like morphology of 10 to 25 nm. Chemical analysis was as follows: 2.9% Al, 42.3% Si, 1.25% Na, 0.92% N, N/Al=0.61, Na/Al=0.51, Si/Al$_2$=28.09.

TABLE 10

| 2θ | d(Å) | I/I$_0$ % |
|---|---|---|
| 7.90 | 11.18 | vs |
| 8.78 | 10.06 | vs |
| 14.82 | 5.97 | w |
| 15.90 | 5.56 | w |
| 20.32 | 4.36 | w |
| 20.75 | 4.27 | w |
| 23.16 | 3.83 | vs |
| 23.72 | 3.74 | m |
| 26.76 | 3.32 | w |
| 29.2 | 3.05 | w |
| 29.87 | 2.98 | w |
| 45.26 | 2.00 | w |

Example 10

An aluminosilicate reaction gel was prepared by first mixing 94.1 g of liquid sodium aluminate (LSA), 302.6 g of dimethyldipropylammonimum hydroxide (40% SACHEM), 101.1 g of diethanolamine (85% Aldrich) and 1959.6 g of water while stirring vigorously. After thorough mixing, 442.5 g of Ultrasil VN SP 89% was added. After the addition was completed, the resulting reaction mixture was homogenized for ½ hour, transferred to a (2) 2-L Parr hastelloy stir autoclave. The mixture was crystallized at 175° C. with stirring at 300 RPM for 115(a) and 139 (b) hours. The solid product was recovered by filtration, washed with de-ionized water and dried at 80° C. The product was identified as UZM-54 by XRD. Representative diffraction lines observed for the product are shown in Table 11. The product composition was determined by elemental analysis to consist of the following mole ratios: (a) Si/Al=29.1, Na/Al=0.5 (b) Si/Al=29.12, Na/Al=0.40. A portion of the material was calcined by ramping to 600° C. for 2 hours followed by a 5 hour dwell in air. The BET surface area was (a) 378 m$^2$/g, the micropore area was 246 m$^2$/g and the mesopore area was 132 m$^2$/g and the micropore volume was 0.127 cc/g and mesopore volume was 0.66 cc/g. (b) (a) 373 m$^2$/g, the micropore area was 254 m$^2$/g and the mesopore area was 119 m$^2$/g and the micropore volume was 0.131 cc/g and mesopore volume was 0.63 cc/g. Scanning Electron Microscopy (SEM) revealed crystals with a roughly spherical or rosette-like morphology of 10 to 25 nm. Chemical analysis was as follows: (a) 2.79% Al, 42.2% Si, 1.18% Na, 0.9% N, N/Al=0.62, Na/Al=0.5, Si/Al$_2$=29.1 (b) 2.83% Al, 42.8% Si, 0.95% Na, 0.9% N, N/Al=0.61, Na/Al=0.39, Si/Al$_2$=29.1.

TABLE 11

| 2θ | d(Å) | I/I$_0$ % |
|---|---|---|
| 7.94 | 11.12 | vs |
| 8.84 | 9.99 | vs |
| 14.78 | 5.98 | w |
| 15.98 | 5.54 | w |
| 20.27 | 4.37 | w |
| 20.78 | 4.27 | w |
| 23.20 | 3.83 | vs |
| 23.80 | 3.73 | s |
| 26.84 | 3.31 | w |
| 29.22 | 2.97 | w |
| 29.99 | 2.97 | w |
| 45.39 | 1.99 | w |

Example 11

An aluminosilicate reaction gel was prepared by first mixing 39.97 g of liquid sodium aluminate (LSA), 149.83 g of dimethyldipropylammonimum hydroxide (40% SACHEM), and 952.88 g of water while stirring vigorously. After thorough mixing, 220.68 g of Ultrasil VN SP 89% was added. After the addition was completed, the resulting reaction mixture was homogenized for ½ hour, transferred to a 2-L Parr hastelloy stir autoclave. The mixture was crystallized at 175° C. with stirring at 300 RPM for 87 hours. The solid product was recovered by filtration, washed with de-ionized water and dried at 80° C. The product was identified as UZM-54 by XRD. Representative diffraction lines observed for the product are shown in Table 12. The product composition was determined by elemental analysis to consist of the following mole ratios: Si/Al=16.18, Na/Al=0.41. A portion of the material was calcined by ramping to 600° C. for 2 hours followed by a 5 hour dwell in air. The BET surface area was 398 m$^2$/g, the micropore area was 268 m$^2$/g and the mesopore area was 130 m$^2$/g and the micropore volume was 0.138 cc/g and mesopore volume was 0.64 cc/g. Scanning Electron Microscopy (SEM) revealed crystals with a roughly spherical or rosette-like morphology of 10 to 25 nm. Chemical analysis was as follows: 2.6% Al, 43.7% Si, 0.91% Na, 0.9% N, N/Al=0.67, Na/Al=0.41 Si/Al$_2$=32.3.

TABLE 12

| 2θ | d(Å) | I/I$_0$ % |
|---|---|---|
| 7.98 | 11.07 | vs |
| 8.86 | 9.97 | vs |
| 14.87 | 5.94 | w |
| 15.96 | 5.54 | w |
| 20.36 | 4.35 | w |
| 20.93 | 4.23 | w |
| 23.20 | 3.83 | vs |
| 23.86 | 3.72 | s |
| 26.82 | 3.32 | w |
| 29.30 | 3.04 | w |
| 29.98 | 2.97 | w |
| 45.42 | 1.99 | w |

Example 12

An aluminosilicate reaction gel was prepared by first mixing 28.00 g of liquid sodium aluminate (LSA), 145.70 g of dimethyldipropylammonimum hydroxide (40% SACHEM), 41.68 g of diethanolamine (Aldrich), 4.23 g of NaOH and 965.81 g of water while stirring vigorously. After thorough mixing, 214.58 g of Ultrasil VN SP 89% was added. After the addition was completed, the resulting reaction mixture was homogenized for ½ hour, transferred to a 2-L Parr hastelloy stir autoclave. The mixture was crystallized at 175° C. with stirring at 300 RPM for 69 hours. The solid product was recovered by filtration, washed with de-ionized water and dried at 80° C. The product was identified as UZM-54 by XRD. Representative diffraction lines observed for the product are shown in Table 13. The product composition was determined by elemental analysis to consist of the following mole ratios: Si/Al=22.53, Na/Al=0.31. A portion of the material was calcined by ramping to 600° C. for 2 hours followed by a 5 hour dwell in air. The BET surface area was 389 m$^2$/g, the micropore area was 300 m$^2$/g and the mesopore area was 89 m$^2$/g and the micropore volume was 0.155 cc/g and mesopore volume was 0.51 cc/g. Scanning Electron Microscopy (SEM) revealed crystals with a roughly spherical or rosette-like morphology of 10 to 25 nm. Chemical analysis was as follows: 1.91% Al, 44.7% Si, 0.51% Na, 0.7% N, N/Al=0.76, Na/Al=0.31 Si/Al$_2$=45.07.

TABLE 13

| 2θ | d(Å) | I/I$_0$ % |
|---|---|---|
| 7.90 | 11.18 | vs |
| 8.81 | 10.02 | vs |
| 14.80 | 5.98 | w |
| 15.90 | 5.56 | w |
| 20.33 | 4.36 | w |
| 20.83 | 4.26 | w |
| 23.12 | 3.84 | vs |
| 23.87 | 3.72 | m |
| 26.88 | 3.31 | w |
| 29.26 | 3.04 | w |
| 29.94 | 2.98 | w |
| 45.46 | 1.99 | w |

Example 13

An aluminosilicate reaction gel was prepared by first mixing 53.77 g of liquid sodium aluminate (LSA), 83.94 g of dimethyldipropylammonimum hydroxide (40% SACHEM), 24.02 g of diethanolamine (Aldrich), 4.39 g of NaOH and 986.63 g of water while stirring vigorously. After thorough mixing, 247.26 g of Ultrasil VN SP 89% was added. After the addition was completed, the resulting reaction mixture was homogenized for ½ hour, transferred to a 2-L Parr hastelloy stir autoclave. The mixture was crystallized at 175° C. with stirring at 300 RPM for 78 hours. The solid product was recovered by filtration, washed with de-ionized water and dried at 80° C. The product was identified as UZM-54 by XRD. Representative diffraction lines observed for the product are shown in Table 14. The product composition was determined by elemental analysis to consist of the following mole ratios: Si/Al=13.48, Na/Al=0.53. A portion of the material was calcined by ramping to 600° C. for 2 hours followed by a 5 hour dwell in air. The BET surface area was 367 m$^2$/g, the micropore area was 257 m$^2$/g and the mesopore area was 110 m$^2$/g and the micropore volume was 0.13 cc/g and mesopore volume was 0.63 cc/g. Scanning Electron Microscopy (SEM) revealed crystals with a roughly spherical or rosette-like morphology of 10 to 25 nm. Chemical analysis was as follows: 3.0% Al, 42.0% Si, 1.35% Na, 0.85% N, N/Al=0.55, Na/Al=0.53 Si/Al$_2$=26.96.

TABLE 14

| 2θ | d(Å) | I/I$_0$ % |
|---|---|---|
| 7.94 | 11.12 | vs |
| 8.86 | 9.97 | s |
| 14.78 | 5.98 | w |
| 15.94 | 5.55 | w |
| 20.34 | 4.36 | w |
| 20.8 | 4.26 | w |
| 23.14 | 3.84 | vs |
| 23.84 | 3.72 | s |
| 26.92 | 3.30 | w |
| 29.92 | 3.05 | w |
| 45.34 | 1.99 | w |

Example 14

An aluminosilicate reaction gel was prepared by first mixing 52.69 g of liquid sodium aluminate (LSA), 123.27 g of dimethyldipropylammonimum hydroxide (40% SACHEM), 35.27 g of diethanolamine (Aldrich), 4.30 g of NaOH and 942.18 g of water while stirring vigorously. After thorough mixing, 242.29 g of Ultrasil VN SP 89% was added. After the addition was completed, the resulting reaction mixture was homogenized for ½ hour, transferred to a 2-L Parr hastelloy stir autoclave. The mixture was crystallized at 175° C. with stirring at 300 RPM for 80 hours. The solid product was recovered by filtration, washed with de-ionized water and dried at 80° C. The product was identified as UZM-54 by XRD. Representative diffraction lines observed for the product are shown in Table 15. The product composition was determined by elemental analysis to consist of the following mole ratios: Si/Al=13.35, Na/Al=0.44. A portion of the material was calcined by ramping to 600° C. for 2 hours followed by a 5 hour dwell in air. The BET surface area was 364 m$^2$/g, the micropore area was 246 m$^2$/g and the mesopore area was 118 m$^2$/g and the micropore volume was 0.13 cc/g and mesopore volume was 0.71 cc/g. Scanning Electron Microscopy (SEM) revealed crystals with a roughly spherical or rosette-like morphology of 10 to 25 nm. Chemical analysis was as follows: 3.05% Al, 42.3% Si, 1.14% Na, 0.93% N, N/Al=0.59, Na/Al=0.44 Si/Al$_2$=26.70.

TABLE 15

| 2θ | d(Å) | I/I$_0$ % |
|---|---|---|
| 7.92 | 11.15 | vs |
| 8.82 | 10.01 | s |
| 14.78 | 5.98 | w |
| 15.92 | 5.56 | w |
| 20.34 | 4.36 | w |
| 20.77 | 4.27 | w |
| 23.14 | 3.84 | vs |
| 23.80 | 3.73 | s |
| 26.82 | 3.32 | w |
| 29.90 | 2.98 | w |
| 45.34 | 1.99 | w |

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A zeolite having a microporous crystalline structure comprising a framework of $AlO_2$ and $SiO_2$ tetrahedral units, and an empirical composition in the as synthesized and anhydrous basis expressed by the empirical formula of:

$$M_m^{n+}R_{1_{r_1}}^{p1+}R_{2_{r_2}}^{p2+}AlSi_yO_z$$

where M is at least one exchangeable cation selected from the group consisting of alkali and alkaline earth metals, "m" is the mole ratio of M to Al and varies from about 0 to about 1, $R_1$ is at least one organoammonium cation selected from the group consisting of quaternary ammonium cations and diquaternary ammonium cations, "$r_1$" is the mole ratio of $R_1$ to Al and has a value of about 0.1 to about 3.0, $R_2$ is at least one organoammonium cation selected from the group consisting of protonated alkanolamines, protonated amines, protonated diamines, and quaternized alkanolammonium cations, "$r_2$" is the mole ratio of $R_2$ to Al and has a value of about 0 to about 3.0, "n" is the weight average valence of M and has a value of about 1 to about 2, "$p_1$" is the weighted average valence of $R_1$ and has a value of about 1 to about 2, "$p_2$" is the weighted average valence of $R_2$ and has a value of about 1 to about 2, "y" is the mole ratio of Si to Al and varies from greater than 11 to about 30 and "z" is the mole ratio of O to Al and has a value determined by the equation:

$$z(m \cdot n + r_1 \cdot p_1 + r_2 \cdot p_2 + 3 + 4 \cdot y)/2$$

and it is characterized in that it has the x-ray diffraction pattern having at least the d spacing and intensities set forth in Table A, wherein I/Io of 5-15=w, 15-60=m, and 80-100=vs:

TABLE A

| 2Θ | d(Å) | I/Io |
|---|---|---|
| 7.91-8.05 | 10.83-11.16 | vs |
| 8.84-9.01 | 9.80-9.99 | vs |
| 14.87-14.91 | 5.93-5.95 | w-m |
| 15.51-15.65 | 5.65-5.70 | w |
| 15.91-16.12 | 5.49-5.56 | w |
| 20.41-20.59 | 4.31-4.34 | w |
| 20.82-20.94 | 4.25-4.43 | w |
| 23.25-23.61 | 3.76-3.82 | vs |
| 23.84-23.92 | 3.71-3.72 | m |
| 24.35-24.75 | 3.59-3.65 | m |
| 26.80-26.95 | 3.30-3.32 | w |
| 29.33-29.46 | 3.02-3.04 | w |
| 30.01-30.13 | 2.96-2.97 | w |
| 30.32-30.32 | 2.94-2.94 | w |

2. The zeolite of claim 1 wherein the zeolite has a mesopore surface area between 80 m²/g and 300 m²/g.

3. The zeolite of claim 1 wherein the zeolite consists of small colonies of nanocrystalline zeolite.

4. The zeolite of claim 1 wherein the zeolite has an individual crystal size from about 10-25 nm.

5. The zeolite of claim 1 further characterized by very strong peaks in the x-ray diffraction pattern at 2θ from 7.91-8.05, 8.84-9.01 and 23.25-23.61.

6. The zeolite of claim 1 wherein the zeolite is a pentasil zeolite.

7. The zeolite of claim 1 wherein the zeolite is thermally stable up to a temperature of 1000° C.

8. The zeolite of claim 1 wherein M is selected from the group consisting of lithium, sodium, potassium, cesium, strontium, calcium, barium and mixtures thereof.

9. The zeolite of claim 1 wherein M is a mixture of an alkali metal and an alkaline earth metal.

10. The zeolite of claim 1 wherein $R_1$ is selected from the group consisting of dimethyldipropylammonium, diethyldipropylammonium, propyltrimethylammonium, hexamethonium, and mixtures thereof.

11. The zeolite of claim 1 wherein $R_2$ is selected from the group consisting of diethanolamine, N-methylethanolamine, 2-dimethylaminoethanol, N-methyldiethanolamine, 2-diethylamino ethanol, 2-isopropylamino ethanol, 2-diisopropylamino ethanol, 3-dimethylamino propanol and 2-aminopropanol and mixtures thereof.

12. The zeolite of claim 1 wherein $r_2$ is equal to zero.

13. The zeolite of claim 12 wherein $R_1$ is selected from the group consisting of dimethyldipropylammonium, diethyldipropylammonium, propyltrimethylammonium, hexamethonium, and mixtures thereof.

14. The zeolite of claim 12 wherein $R_1$ is a mixture of dimethyldipropylammonium and a quaternary ammonium cation.

15. The zeolite of claim 12 wherein a silica/alumina (Si/Al₂) ratio is between 22 and 50.

16. The zeolite of claim 12 further characterized by a mesopore surface area greater than 80 m²/g.

17. The zeolite of claim 12 wherein $R_1$ is the dimethyldipropylammonium cation, where a source of $R_1$ is the halide or hydroxide compounds of $R_1$.

18. The zeolite of claim 1 wherein i crystallite size is from 61 to about 600 Å.

19. The zeolite of claim 1 wherein a source of $R_1$ is dimethyldipropylammonium hydroxide.

20. The zeolite of claim 1 wherein the zeolite has a microporous crystalline structure comprising a framework of $AlO_2$ and $SiO_2$ tetrahedral units, further including the element E and having the empirical composition in the as synthesized and anhydrous basis expressed by the empirical formula of:

$$M_m^{n+}R_{1_{r_1}}^{p1+}R_{2_{r_2}}^{p2+}Al_{1-x}E_xSi_yO_z$$

where "m" is the mole ratio of M to (Al+E) and varies from about 0 to about 1, "$r_1$" is the mole ratio of $R_1$ to (Al+E) and has a value of about 0.1 to about 3.0, "$r_2$" is the mole ratio of $R_2$ to (Al+E) and has a value of about 0 to about 3.0, E is an element selected from the group consisting of gallium, iron, boron, indium and mixtures thereof, "x" is the mole fraction of E and has a value from 0 to about 1.0, "y" is the mole ratio of Si to (Al+E) and varies from greater than 11 to about 30 and "z" is the mole ratio of O to (Al+E) and has a value determined by the equation:

$$z = (m \cdot n + r_1 \cdot p_1 + r_2 \cdot p + 3 + 4 \cdot y)/2.$$

* * * * *